UNITED STATES PATENT OFFICE.

HORACE W. LASH AND JAMES JOHNSON, OF PITTSBURG, PENNSYLVANIA.

PROCESS OF REDUCING IRON ORES.

SPECIFICATION forming part of Letters Patent No. 441,102, dated November 18, 1890.

Application filed April 29, 1889. Renewed September 12, 1890. Serial No. 364,710. (No specimens.)

*To all whom it may concern:*

Be it known that we, HORACE W. LASH and JAMES JOHNSON, citizens of the United States, residing at Pittsburg, in the county of Allegheny and State of Pennsylvania, have invented or discovered a certain new and useful Improvement in the Process of Reducing Iron Ores, of which improvement the following is a specification.

The invention described herein relates to certain improvements in the direct process of reducing iron from its ore, and has for its object the production of a high-carbon metal as well as the ordinary metal usually produced in the direct process.

In the practice of the invention the ore and carbonaceous material are reduced independently of each other to lumps of such a size as will pass through a screen having a quarter-inch mesh, (more or less,) thereby insuring such a practical uniformity of size of the two materials as will facilitate a thorough commingling of them. The ore and carbonaceous material are then mixed together in a heap by a shovel or otherwise and passed through a screen having a half-inch mesh, (more or less,) so as to effect a more thorough and uniform mingling together of the two materials. The mingled ore and carbonaceous material, the latter being about twenty to thirty per cent., (more or less,) by weight, of the ore—*i. e.*, twenty or thirty pounds (more or less) of the carbonaceous material for every hundred pounds of ore—and then transferred to a grinding-pan or other suitable apparatus and thoroughly pulverized and ground together. This grinding operation is continued until the materials are finely pulverized. The greater the degree of pulverization and grinding of the two substances into each other, so that their relation to each other partakes as near as possible in a mechanical treatment of the nature of a chemical combination or homogeneous mass, the better the final results. During this grinding operation it is preferred to moisten the materials by the addition of fluid, so as to form a pasty mass or amalgam, the fluid employed being by preference of such a characteristic—*e. g.*, silicate of soda, coal tar, &c.—as will cause the materials to adhere together and harden or cake into a solid homogeneous mass when dried. The amalgam thus prepared is spread evenly over the hearth of a reverberatory, open-hearth, or other suitable furnace and there subjected to the action of a hot reducing flame. The first action of the heat, owing to the binding material—*i. e.*, silicate of soda—is to harden and cement the materials into a homogeneous cake on the hearth of the furnace. After the material has hardened, as above stated, the charge is raised and broken up into irregular masses by a bar, permitting the heat to penetrate the entire mass, thus facilitating the chemical action and effecting a more complete absorption of carbon. A covering of pulverized glass and carbonaceous material (one-third carbon and two-thirds glass, more or less) is then scattered all over the charge. This material soon melts down, covering all the surfaces of the charge with a smooth uniform coating, thus preventing any oxidation either of the ore or carbon. In other words, this cover of carbon and glass plays precisely the same part as the cap or cover of a crucible—*i. e.*, prevents the escape and separation of the oxygen of the ore and the carbonic oxide from the carbonaceous material before they can combine. Until the glass has liquefied and coated the entire charge, as above stated, a hot reducing or deoxidizing heat is maintained in the furnace; but as soon as the protecting-coating has been formed it is preferred to employ an oxidizing heat, as it facilitates by its increased temperature a more rapid evolution and subsequent combination of the gases from the ore and carbonaceous material. An elimination of the phosphorus and other deleterious substances in the gangue of the ore can be effected by this process by tapping or skimming off as soon as the slag becomes sufficiently fluid and before the bath is raised to a temperature at which the phosphorus and metallic iron combine, the phosphorus remaining in the slag as phosphoric acid is removed therewith.

A charge of the material, treated as hereinbefore stated, can be brought to a liquid condition in a suitable open-hearth furnace—as, for example, one of the Lash type—in four or five hours, and if the ore and carbonaceous material have been commingled in proper proportions the bath will then contain from 3.80 to 4.56 per cent. of combined carbon, and the iron will show a highly crystalline fracture of a blue-gray color.

By this process any desired carbon in any or all heats may be obtained by adding ore to the bath when it is desired to reduce the carbon, or by adding further amounts of the amalgam, prepared with a higher percentage of carbon, when it is desired to increase the carbon in the bath. For the production of high-carbon metal a suitable proportion of lamp-black may be employed in the preparation of the amalgam, whether the same is to be used as the original charge or for increasing the carbon of the bath, as hereinbefore described.

In the reduction of large quantities of ore it is preferred to charge into the hearth only a comparatively small quantity of the amalgam, which is treated as hereinbefore stated, and as soon as the metallic iron has been reduced and melted, thus forming a molten bath, another portion of the amalgam is charged into the bath thus prepared, and as soon as this second portion has been absorbed a third portion of the amalgam is charged. This operation is continued until the desired amount of molten metal has been obtained. In this step-by-step method of charging the material each additional portion of the metal as it is placed in the bath sinks below the surface of the molten metal and slag therein, and is in that way protected from any oxidation. It will be readily understood that in this method of quantitive charging the bottom of the furnace may be maintained at a higher temperature than if the entire amount of amalgam were placed in the furnace at one time, and hence by reason of this higher temperature less time is consumed in effecting reduction.

We claim herein as our invention—

1. The method herein described of reducing iron direct from ore, which consists in grinding moistened ore and carbonaceous material together into a pulverized homogeneous paste or amalgam, spreading the paste thus formed in the hearth of a furnace, covering the charge with a mixture of pulverized glass and carbon, and then subjecting the charge to a heat to effect the desired reduction, substantially as set forth.

2. The method herein described of reducing iron direct from ore, which consists in grinding moistened ore and carbonaceous material together into a pulverized homogeneous paste or amalgam, spreading the paste thus formed on the hearth of a furnace, covering the charge with a mixture of pulverized glass and carbonaceous material, reducing this charge to a molten condition, and then from time to time adding thereto additional amounts of the paste or amalgam, substantially as set forth.

In testimony whereof we have hereunto set our hands.

HORACE W. LASH.
    JAMES JOHNSON.

Witnesses:
 W. B. CORWIN,
 DARWIN S. WOLCOTT.